US009607080B2

(12) United States Patent
Yokoyama et al.

(10) Patent No.: US 9,607,080 B2
(45) Date of Patent: Mar. 28, 2017

(54) ELECTRONIC DEVICE AND METHOD FOR PROCESSING CLIPS OF DOCUMENTS

(71) Applicant: Kabushiki Kaisha Toshiba, Minato-ku, Tokyo (JP)

(72) Inventors: Sachie Yokoyama, Ome (JP); Eita Shuto, Tokyo (JP)

(73) Assignee: Kabushiki Kaisha Toshiba, Tokyo (JP)

(*) Notice: Subject to any disclaimer, the term of this patent is extended or adjusted under 35 U.S.C. 154(b) by 202 days.

(21) Appl. No.: 14/256,469

(22) Filed: Apr. 18, 2014

(65) Prior Publication Data

US 2015/0026179 A1 Jan. 22, 2015

(30) Foreign Application Priority Data

Jul. 22, 2013 (JP) ................................. 2013-152074

(51) Int. Cl.
*G06F 17/30* (2006.01)

(52) U.S. Cl.
CPC .. *G06F 17/30716* (2013.01); *G06F 17/30867* (2013.01); *G06F 17/30899* (2013.01)

(58) Field of Classification Search
CPC ......... G06F 17/30716; G06F 17/30867; G06F 17/30899
USPC .................................................. 707/737, 812
See application file for complete search history.

(56) References Cited

U.S. PATENT DOCUMENTS

| 6,970,859 | B1* | 11/2005 | Brechner | G06F 17/30017 707/999.003 |
| 9,430,716 | B2* | 8/2016 | Akira | G06K 9/50 345/619 |
| 2006/0195426 | A1 | 8/2006 | Ishii et al. | |
| 2007/0255755 | A1* | 11/2007 | Zhang | G06F 17/30799 707/E17.028 |
| 2008/0091751 | A1* | 4/2008 | Vendelin | G06F 17/3028 707/E17.019 |
| 2008/0201452 | A1* | 8/2008 | Athas | H04L 29/12594 709/219 |
| 2011/0078176 | A1* | 3/2011 | Hayaishi | G06F 17/30265 707/769 |
| 2012/0066059 | A1* | 3/2012 | Berger | G06Q 30/0277 705/14.49 |

(Continued)

FOREIGN PATENT DOCUMENTS

| JP | 2002-189754 A | 7/2002 |
| JP | 2006-085392 A | 3/2006 |

(Continued)

*Primary Examiner* — Phong Nguyen
(74) *Attorney, Agent, or Firm* — Knobbe, Martens Olson & Bear LLP

(57) ABSTRACT

According to one embodiment, an electronic device includes a display processor and a processor. The display processor is configured to display on a screen a plurality of clips. Each of the plurality of clips corresponds to at least a part of a document. The processor is configured to designate a first clip group in the plurality of clips as a search key in accordance with an operation by a user, and to acquire information regarding one or more second clips of the plurality of clips, the one or more second clips being related to the first clip group. The display processor is further configured to display the one or more second clips as a search result corresponding the search key.

10 Claims, 10 Drawing Sheets

(56) References Cited

U.S. PATENT DOCUMENTS

2012/0256947 A1* 10/2012 Akira .................... G06K 9/50
                                                                             345/619
2014/0359489 A1* 12/2014 Zhao .................... G06F 3/0482
                                                                             715/760
2015/0012271 A1* 1/2015 Peng .................... G10L 15/08
                                                                             704/235

FOREIGN PATENT DOCUMENTS

| JP | 2006-236140 A | 9/2006 |
| JP | 2007-316743 A | 12/2007 |
| JP | 2008-226202 A | 9/2008 |
| JP | 2009-205588 A | 9/2009 |

* cited by examiner

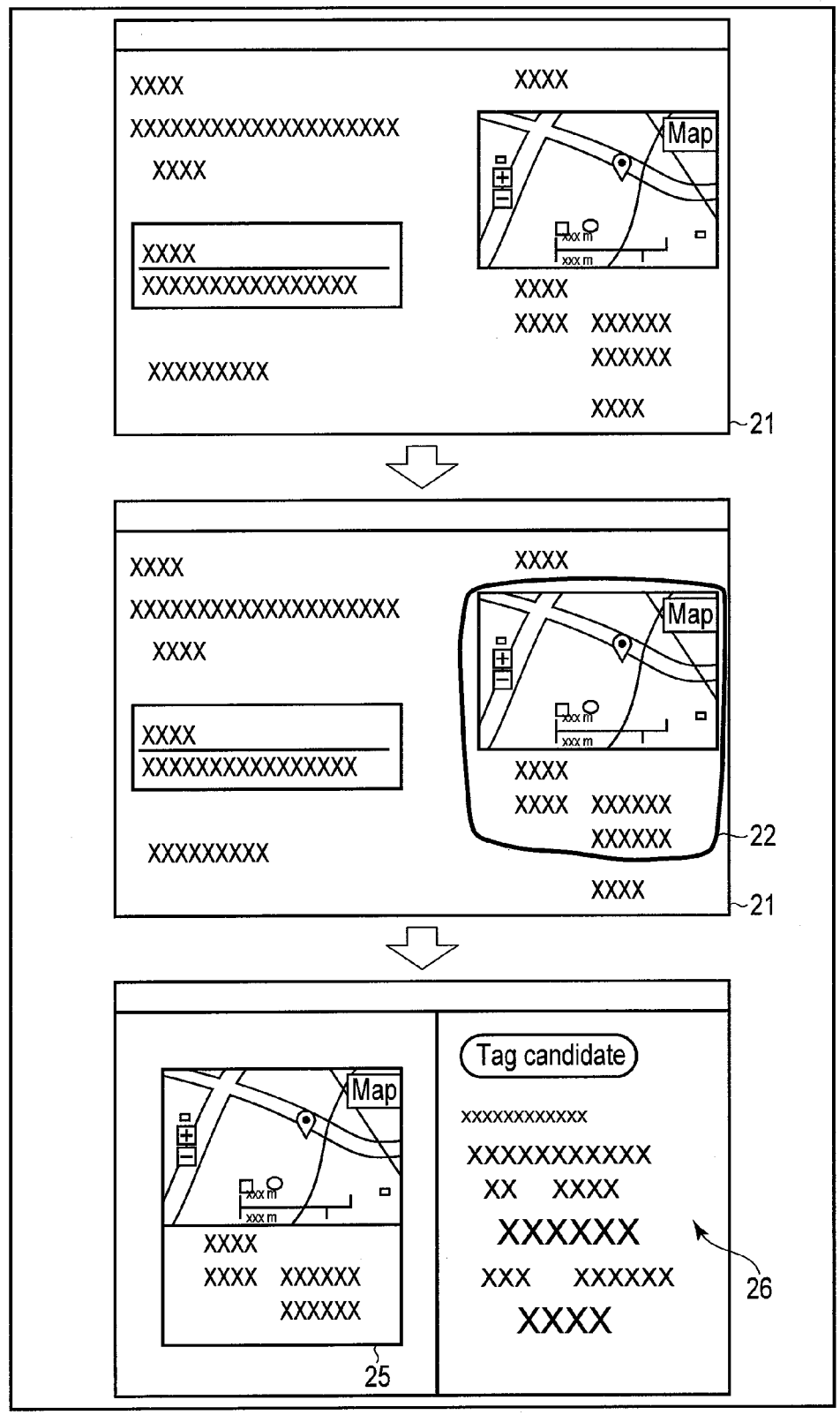
F I G. 3

| Clip ID | Document | Clip area | Tag 1 | ... | Keyword 1 | ... | ... |
|---|---|---|---|---|---|---|---|
| ... | ... | ... | ... | ... | ... | ... | ... |
| ... | ... | ... | ... | ... | ... | ... | ... |
| ⋮ | ⋮ | ⋮ | ⋮ | ⋮ | ⋮ | ⋮ | ⋮ |

F I G. 5

ELECTRONIC DEVICE AND METHOD FOR PROCESSING CLIPS OF DOCUMENTS

CROSS-REFERENCE TO RELATED APPLICATIONS

This application is based upon and claims the benefit of priority from Japanese Patent Application No. 2013-152074, filed Jul. 22, 2013, the entire contents of which are incorporated herein by reference.

FIELD

Embodiments described herein relate generally to a technique for clipping.

BACKGROUND

In recent years, various electronic devices such as tablets, PDAs and smart phones have been developed. Such electronic devices are widely used as tools for using various services on the Internet such as Web browsing, electronic mail and social network service (SNS).

Also, in recent years, attention has been focusing on a clipping function. The clipping function is a function of storing a Web page being displayed, as a clip (a Web clip). It enables a user to store a Web page containing, e.g., an interesting article, as a clip in a database. The clips stored in the database can be reused as occasion demands.

However, when a large number of clips are accumulated in the database, it may be difficult to find out a desired clip in the clips.

BRIEF DESCRIPTION OF THE DRAWINGS

A general architecture that implements the various features of the embodiments will now be described with reference to the drawings. The drawings and the associated descriptions are provided to illustrate the embodiments and not to limit the scope of the invention.

FIG. 3 is an exemplary view illustrating a series of screen images in clipping processing which is executed by the electronic device according to the embodiment.

FIG. 5 is a view illustrating an example of clip data for use in the electronic device according to the embodiment.

DETAILED DESCRIPTION

Various embodiments will be described hereinafter with reference to the accompanying drawings.

In general, according to one embodiment, an electronic device includes a display processor and a processor. The display processor is configured to display on a screen a plurality of clips. Each of the plurality of clips corresponds to at least a part of a document. The processor is configured to designate a first clip group in the plurality of clips as a search key in accordance with an operation by a user, and to acquire information regarding one or more second clips of the plurality of clips, the one or more second clips being related to the first clip group. The display processor is further configured to display the one or more second clips as a search result corresponding the search key.

Figure 1:
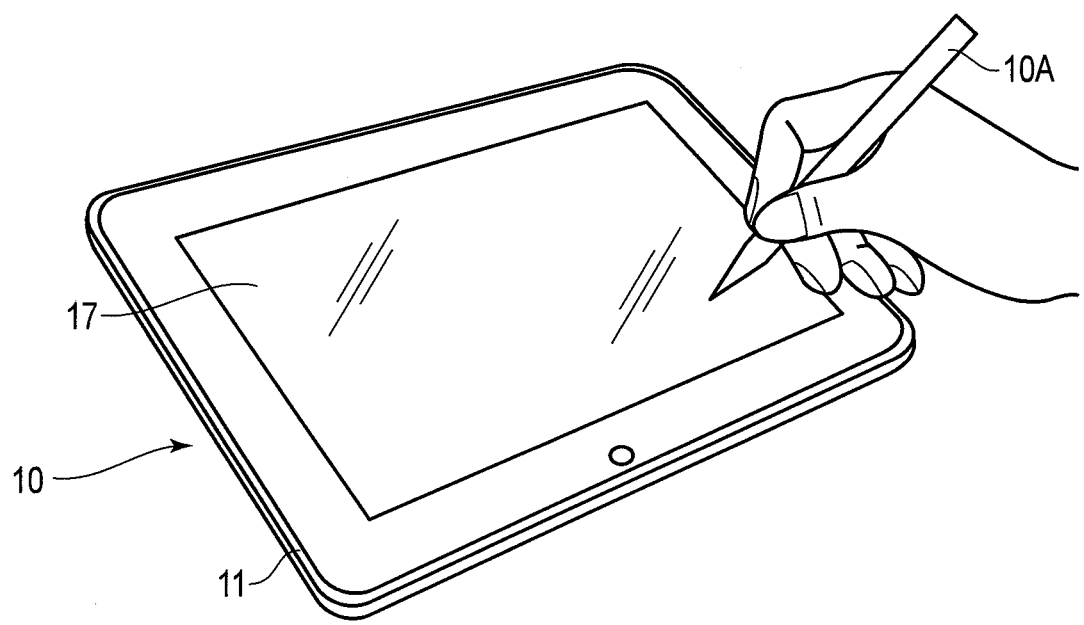
FIG. 1 is an exemplary perspective view illustrating an appearance of an electronic device according to an embodiment.

FIG. 1 is a perspective view of an appearance of an electronic device according to an embodiment. The electronic device is a portable electronic device capable of executing a handwriting input with a pen or a finger. The electronic device may be realized as a tablet computer, a notebook personal computer, a smart phone, a PDA, or the like. The following explanation is given with respect to the case where the electronic device is realized as a tablet computer 10.

The tablet computer 10 is a portable electronic device which is also called tablet or slate computer. The tablet computer 10 can function as a terminal for use in using, e.g., Web browsing, electronic mail and social network service (SNS). Also, the tablet computer 10, as shown in FIG. 1, comprises a main body 11 and a touch screen display 17. The touch screen display 17 is attached to the main body 11 such that it is laid over an upper surface of the main body 11.

The main body 11 has a housing formed in the shape of a thin box. The touch screen display 17 incorporates a flat panel display and a sensor configured to detect the position of a pen or a finger which contacts a screen of the flat panel display. As the flat panel display, for example, a liquid crystal display (LCD) may be provided. As the sensor, for example, a capacitance-type touch panel or an electromagnetic induction type digitizer can be provided. The following explanation is given with respect to the case where two types of sensors, i.e., a digitizer and a touch panel, are both incorporated in the touch screen display 17.

The digitizer and the touch panel are provided in such a manner as to be laid over the screen of the flat panel display. The touch screen display 17 can detect not only a touch (contact) operation on the screen with use of a finger, but also a touch (contact) operation on the screen with use of a pen 10A. As the pen 10A, for example, an electromagnetic induction pen may be provided. On the touch screen display 17, a user can make various motions (gesture operations) such as tapping, dragging, swiping and flicking with the pen 10A or his or her finger.

Furthermore, the user can use the pen 10A to do handwriting input onto the touch screen display 17. In the embodiment, some application programs which are installed on the tablet computer 10 support a handwriting input. For example, a Web browser application program installed on the table computer 10 comprises a handwriting engine and a clip engine. The handwriting engine comprises a drawing module configured to draw an object on the screen in accordance with an input by handwriting, and a gesture detector configured to detect various gestures on the screen that use a finger or the pen 10A. During the handwriting input operation, a locus of movement of the pen 10A on the screen, that is, a stroke (a locus of a handwritten stroke) which is handwritten by a handwriting input operation, is drawn in real time, and thereby plural strokes, which have been input by handwriting, are displayed on the screen. The clip engine is a module for performing a clipping function, and executes clipping processing for creating a clip from a displayed document or a part of the displayed document, and storing the clip in a storage medium.

The Web browser application program can add a handwritten object to various documents which are created using a markup language such as HTML, and also can perform a clipping operation on the documents.

Figure 2:
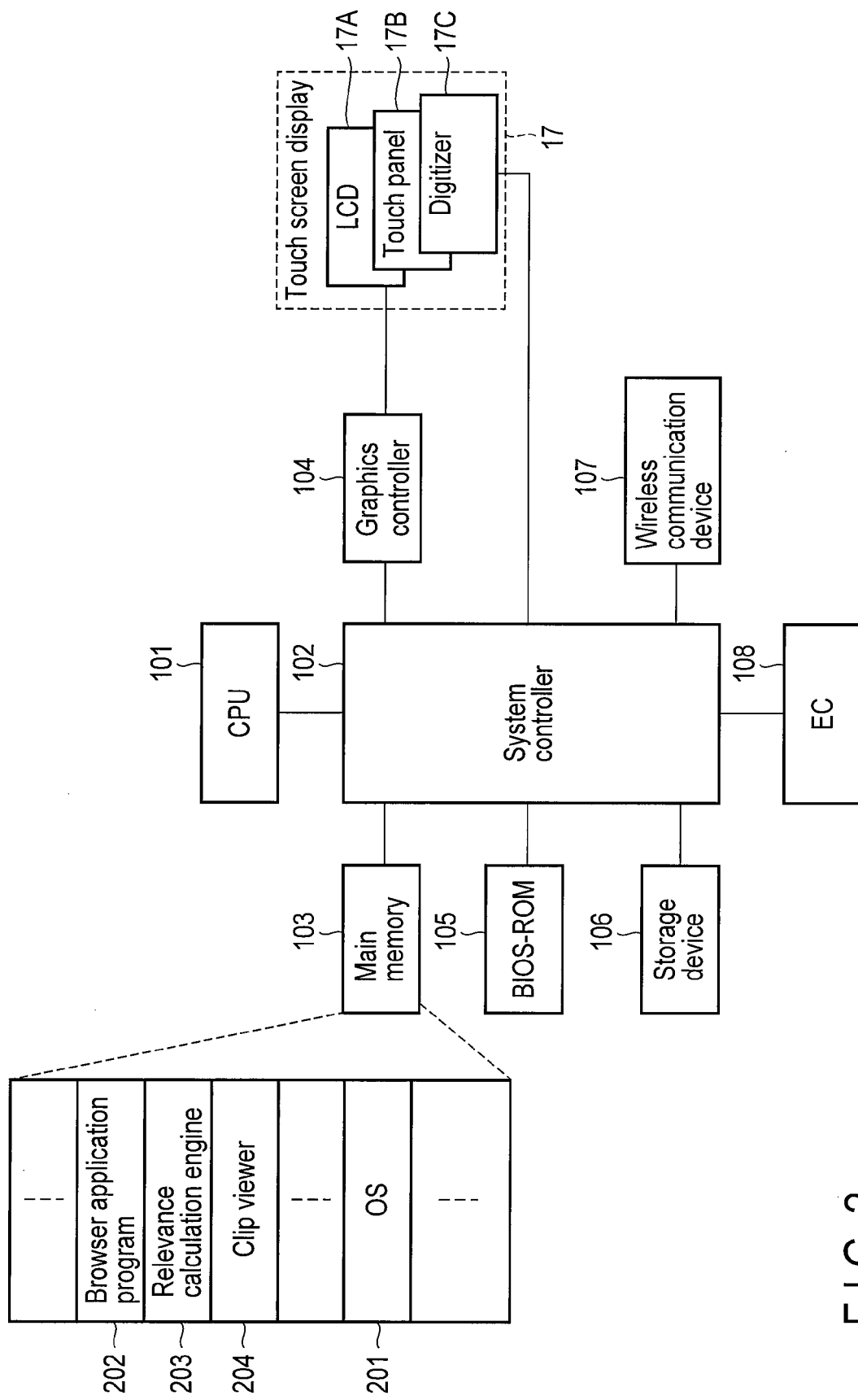
FIG. 2 is an exemplary block diagram illustrating a system configuration of the electronic device according to the embodiment.

FIG. 2 is a view illustrating a system configuration of the tablet computer 10 according to the embodiment.

The tablet computer 10, as shown in FIG. 2, comprises a CPU 101, a system controller 102, a main memory 103, a graphics controller 104, a BIOS-ROM 105, a storage device 106, a wireless communication device 107, an embedded controller (EC) 108, etc.

The CPU 101 is a processor configured to control operations of various modules provided in the tablet computer 10. The CPU 101 executes various programs loaded from the storage device 106 into the main memory 103. The programs to be executed by the CPU 101 include an operating system (OS) 201 and various application programs. The application programs include a browser application program 202, a relevance calculation engine 203, a clip viewer 204, etc.

The browser application program 202 has a function of obtaining data of a Web page from a Web server, a function of displaying the Web page on the screen, and a function of executing clipping processing. The clipping processing, as described above, is processing for storing in a storage medium a clip (which can also be referred to as clip data) corresponding to at least a part of a displayed document. The clip corresponds to a given document or a part of the document. The kinds of documents to which the clipping function can be applied are not limited. However, as an example of such a document, a Web page is present.

The relevance calculation engine 203 has a function of calculating a degree of relevance between documents (e.g., degree of relevance between Web pages) based on texts contained in the documents.

The clip viewer 204 displays a plurality of clips on the screen. To be more specific, the clip viewer 204 has a function for viewing all clips stored in the storage medium. In other words, the clip viewer 204 can display a clip list view screen for enabling a plurality of clips stored in the storage medium to be viewed. Each of the clips may be a Web clip. The Web clip is a clip (clip data) corresponding to at least a part of a given Web page (Web document).

The CPU 101 also executes a basic input output system (BIOS) stored in the BIOS-ROM 105. The BIOS is a program for controlling hardware.

The system controller 102 is a device which connects a local bus of the CPU 101 and various components. The system controller 102 incorporates a memory controller configured to perform an access control of the main memory 103. Also, the system controller 102 has a function of communicating with the graphics controller 104 through a serial bus.

The graphics controller 104 is a display controller configured to control an LCD 17A used as a display monitor of the tablet computer 10. A display signal produced by the graphics controller 104 is sent to the LCD 17A. The LCD 17A displays a screen image based on the display signal. At an upper layer of the LCD 17A, a touch panel 17B is provided as a first sensor configured to detect the position of a finger contacting the screen. At a lower layer of the LCD 17A, a digitizer 17C is provided as a second sensor configured to detect the position of the pen 10A contacting the screen. The touch panel 17B is a capacitance type of pointing device configured to do input onto the screen of the LCD 17A. The position, movement, etc. of the finger contacting the screen are detected by the touch panel 17B. The digitizer 17C is an electromagnetic induction type of pointing device configured to do input onto the screen of the LCD 17A. The position, movement, etc. of the pen 10A contacting the screen are detected by the digitizer 17C.

The OS 201 issues an input event which indicates that a finger has touched the screen and the contact position of the finger in cooperation with a driver program for controlling the touchpanel 17B. In addition, the OS 201 issues an input event which indicates that the pen 10A has touched the screen and the contact position of the pen 10A in cooperation with a driver program for controlling the digitizer 17C.

The wireless communication device 107 is a device configured to perform wireless communication such as wireless LAN or 3G mobile communication.

The EC 108 is a one-chip microcomputer including an embedded controller for power management. The EC 108 has a function of turning on or off the tablet computer 10 in accordance with an operation of a power button by the user.

FIG. 3 illustrates an example of a screen sequence of extracting a clip from a currently displayed document (e.g., a Web page) and attaching a tag to the clip.

On the screen, a document (Web page) 21 including a text and an image is displayed. The user can display desired Web page 21 on the screen by staring up, for example, the browser application program 202 and performing so-called net surfing.

There is a case where when viewing a Web page 21, the user wishes to store interesting part or part to be utilized later of the Web page 21 in the storage medium. In this case, the user performs a clipping operation for designating a clip area 22 in the currently displayed Web page 21, using such a pointing device as the touch screen display 17.

In the embodiment, based on the clip area 22, a clip (Web clip data) 25 corresponding to at least a part of the area of the document can be extracted and created. The clip (Web clip data) is a combination of a structured text which designates the entire HTML file obtained at a given URL or a part of the HTML, an image and a video file which are attached to the text.

Then, when the clip operation is performed, the extracted and created clip 25 and tag candidates (which will also be referred to as recommended tags) 26 corresponding to the content of the clip 25 are displayed. The tag candidates 26 are candidates of tags to be associated with the clip 25. It should be noted that the tags are additional information items associated with clips in order to classify, search and identify the clips. As such a tag, an arbitrary word or words or the like can be used.

If the user has selected one of the tag candidates 26 by, for example, tapping the tag candidate, the selected tag is associated with the clip 25. The clip 25 and the tag associated with the clip 25 are stored in the storage medium.

Figure 4:
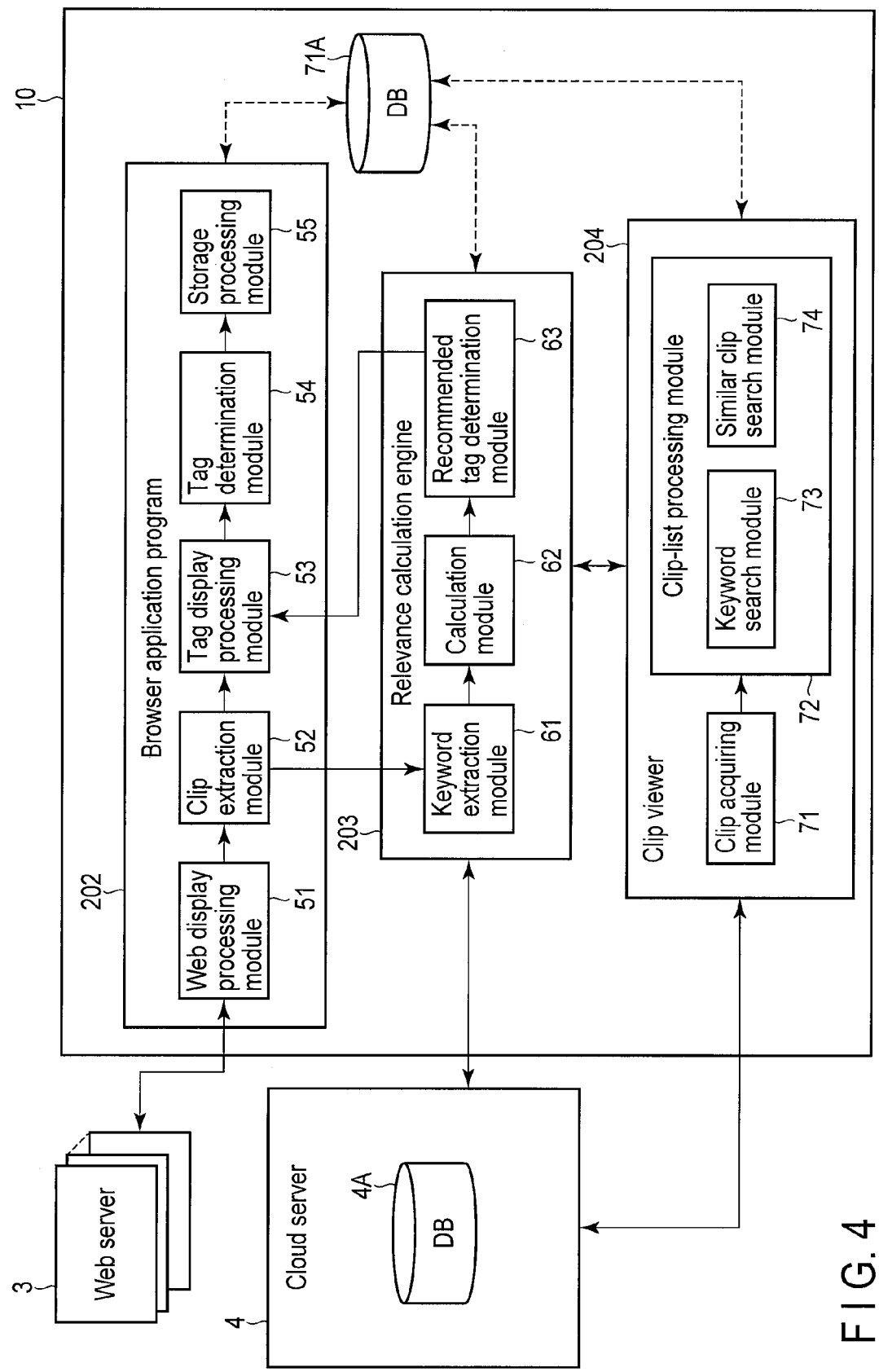
FIG. 4 is an exemplary block diagram illustrating a functional configuration of a program to be carried out by the electronic device according to the embodiment.

FIG. 4 illustrates functional structures of programs to be executed by the tablet computer 10, i.e., functional structures of the browser application program 202, the relevance calculation engine 203 and the clip viewer 204.

Firstly, the browser application program 202 will be described. The browser application program 202 comprises a Web display processing module 51, a clip extraction module 52, a tag display processing module 53, a tag determination module 54 and a storage processing module 55.

The Web display processing module 51 receives data of a Web page (Web document) 21 from a Web server 3, and displays the Web page 21 on the screen of the LCD 17A based on the received data. To be more specific, for example, the Web display processing module 51 receives from the Web server 3 an HTML file corresponding to a URL designated by the user. Then, the Web display processing module 51 analyzes the received HTML file, and displays the Web page 21 corresponding to the received HTML file on the screen based on the result of the analyze.

The clip extraction module 52 selects a clip 25 including at least a part of the displayed Web page 21 from the displayed Web page 21 in accordance with a clip operation by the user. The clip operation is an operation for designating an arbitrary area 22 on the Web page 21, using a pointing device such as the touch panel 17B or the digitizer 17C. The clip extraction module 52 extracts as a clip 25 a text or an image located in the area 22 on the Web page 21, which is designated by the clip operation. The clip extraction module 52 may extract a source code corresponding to the area 22 from an HTML source code corresponding to the Web page 21.

Furthermore, the clip extraction module 52 outputs the currently displayed Web page (HTML file) 21 to the relevance calculation engine 203. The relevance calculation engine 203 outputs a plurality of recommended tags 26 for the clip 25, which are determined using the Web page 21, to the browser application program 202 (to be more specific, it outputs the recommended tags 26 to the tag display processing module 53). The functional structure of the relevance calculation engine 203 will be explained later.

The tag display processing module 53 displays on the screen the clip 25 and the recommended tags 26 output by the relevance calculation engine 203. A score indicative of relevance between each of the recommended tags 26 and the clip 25 may be associated with each of the recommended tags 26. In this case, the tag display processing module 53 may set sizes or positions in which the recommended tags 26 are displayed, in accordance with the respective scores associated with the recommended tags 26.

The tag determination module 54 determines a tag 26 to be associated with the clip 25 from the displayed recommended tags 26. If a certain tag 26 is selected from the recommended tags 26 by the user, the tag determination module 54 determines the selected tag 26 as a tag 26 to be associated with the clip 25. On the other hand, if none of the recommended tags 26 is selected by the user, the tag determination module 54 may automatically determines one or more tags 26 from the recommended tags 26 as one or more tags 26 (concealed tags) to be associated with the clip 25.

The storage processing module 55 stores data (clip data) corresponding to the clip 25 in the storage medium. In this case, the storage processing module 55 may store as the data (clip data) corresponding to the clip 25, a Web page (document) 21, information indicative of a clip area and a tag in the storage medium. As the storage medium, a database (DB) 4A on a cloud server 4 or a local database (DB) 71A in the tablet computer 10 can be used. The local DB 71A is a storage region of, e.g., the storage device 106. It should be noted that as described later with reference to FIG. 5, the storage processing module 55 may further store other data regarding the clip 25 in the storage medium.

Next, the relevance calculation engine 203 will be explained.

The relevance calculation engine 203 comprises a keyword extraction module 61, a calculation module 62 and a recommended-tag determination module 63.

The keyword extraction module 61 analyzes the Web page 21 (HTML file) output by the browser application program 202, thereby extracting a keyword from the Web page 21. To be more specific, the keyword extraction module 61 subjects an HTML source code corresponding to the Web page 21 to a document object model (DOM) analysis, thereby extracting text data (e.g., title, sentence, etc.) that excludes, for example, the HTML tag. The keyword extraction module 61 performs morpheme analysis on the extracted text data to thereby separate the text data into words (morphemes), and determines the word class (i.e., part of speech) of each word using a dictionary. After that, the keyword extraction module 61 extracts a characteristic word on the Web page 21 as a keyword for the Web page 21 from the words obtained by the morpheme analysis.

The keyword extraction module 61 may extract a word which is a noun, from the words obtained by the morphemic analysis. Also, the keyword extraction module 61 may extract a word which is a proper noun or a word put between brackets, e.g., square brackets ([ ]) or double quotation marks (" "), as a keyword.

Furthermore, in accordance with a prescribed rule, the keyword extraction module 61 may extract a keyword from the words obtained by the morphemic analysis. This rule defines, for example, that a word (e.g., "title") used in common between various documents (Web pages) should not be extracted as a keyword.

Then, the calculation module 62 calculates the degree of relevance between the extracted clip 25 and each of stored clips. For example, the calculation module 62 utilizes, as the degree of relevance between clips, the degree of relevance between the currently displayed Web page 21 and each of the Web pages from which the clips stored in the DB 71 or the DB 4A in a cloud server 4 were extracted.

To be more specific, first, the calculation module 62 reads a plurality of clip data stored in the DB 4A through a network. Alternatively, the calculation module 62 may read a plurality of clip data from the local database 71A.

Figure 5:
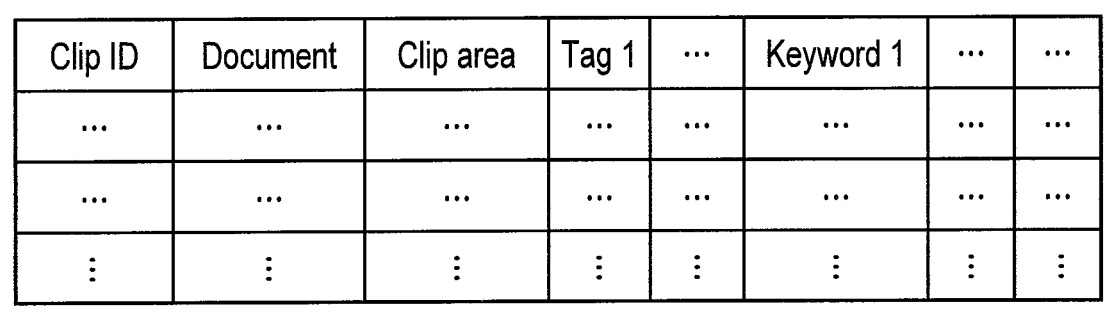

FIG. 5 illustrates an example of a structure of clip data stored in the DB 4A or the DB 71A. The DB 4A or DB 71A includes a plurality of entries associated with a plurality of clips. In such a manner, the entries are associated with the clips (clip data items), respectively. Each of the entries includes clip ID, a document, a clip area, some tags and some keywords.

In an entry associated with a given clip, "clip ID" indicates identification information assigned to the clip, and "document" indicates a document (source) from which the clip is extracted. As such a document, various documents each containing a text, an image or video, such as Web pages, are present. In "document", for example, the contents of a file corresponding to a Web page from which the clip is extracted (e.g., an HTML source code in an HTML file) are set.

"Clip area" indicates the area on the document corresponding to the clip. For instance, if the clip is extracted from a Web page based on an HTML file, in the entry "Clipping area," the HTML source code (or the area of the HTML source code) in the HTML file that corresponds to the clip is set.

"Tag" indicates the tag associated with the clip. In one entry, a plurality of "Tags" can be included. Namely, one clip can be associated with a plurality of tags. "Keyword" indicates a keyword extracted from the document. If plural keywords are extracted from a single clip, a single entry includes a plurality of "keywords".

The calculation module 62 calculates the degree of relevance between the clip 25 and each of the clips stored in the DB 71 (or DB 4A), using one or more first keywords contained in the currently displayed Web page 21, and one or more second keywords contained in the clip data corresponding to the already stored clips (i.e., one or more second keywords corresponding to the stored clips). In other words, the calculation module 62 calculates the degree of relevance between the currently displayed Web page 21 and each of the Web pages which are the source pages of the stored clips, using one or more first keywords and one or more second keywords. The degree of relevance is higher if the first and second keywords contain a larger number of common keywords. If there is no common keyword, the degree of relevance is, for example, 0. Namely, the calculation module 62 calculates the degree of relevance between clips (i.e., between Web pages) based on the co-occurrence degree of keywords.

The calculation module 62 can calculate the degree of relevance between clips, not only using the co-occurrence degree of keywords, but also using various features in format or meaning, such as the times and dates of the generation of the clips, the times and dates at which the Web pages were accessed to extract the clips from the Web pages, the document types of the Web pages, and the fields to which the clips belong. For example, the calculation module 62 may calculate the degree of relevance, using clip data associated with the clips that are already stored in the DB 71 (or DB 4A) and were generated within a preset period (e.g., in the same time zone).

The recommended-tag determination module 63 determines as the recommended tags 26, tags related to a currently displayed Web page (first document) 21, from one or more tags associated with each of a plurality of clip data stored in the DB 71A (or the DB 4A). To be more specific, the recommended-tag determination module 63 determines a relevant Web page (second document) which is related to the currently displayed Web page (first document) 21, based on the degree of relevance calculated by the calculation module 62. The recommended-tag determination module 63 determines a Web page having the degree of relevance which is equal to or higher than a threshold value, as the relevant Web page. Then, the recommended-tag determination module 63 determines as the recommended tags 26, one or more tags associated with a clip including at least part of the above relevant Web page, using clip data corresponding to the relevant Web page. Also, the recommended-tag determination module 63 may further add keywords extracted from the currently displayed Web page 21 to the recommended tags 26.

The recommended-tag determination module 63 outputs the determined recommended tags 26 to the browser application program 202 (the tag display processing module 53).

As described above, the tag display processing module 53 of the browser application program 202 displays the clip 25 and one or more recommended tags 26 on the screen. If the first one of the one or more recommended tags 26 displayed is selected, the storage processing module 55 stores in the DB 71A (or the DB 4A), clip data indicating the Web page (first document) 21, the clip (first clip) 25, the first tag, and keywords extracted from the Web page 21. On the other hand, if none of the displayed one or more recommended tags 26 is selected (e.g., if no tag is selected, and a request for browsing other Web pages is made), the storage processing module 55 stores in the DB 71A (or the DB 4A), clip data indicating the Web page (first document) 21, the clip (first clip) 25, a tag 26 automatically selected from one or more recommended tags 26, and keywords extracted from the Web page 21.

In such a manner, the user does not need to input a tag with a keyboard, and thus a tag to be associated with the clip 25 can be easily added thereto. Furthermore, since the recommended tags 26 are displayed utilizing the tags associated with the clips already stored in the DB 71, changes in the wording of the tag associated with the clip 25 can be suppressed, compared to the case where the user directly inputs the tag using the keyboard. By virtue of this feature, a desired clip can be efficiently searched for based on the tags.

The clip viewer 204 displays a plurality of clips on the screen. That is, the clip viewer 204 has a function for enabling viewing of stored clips, using clip data stored in the DB 71 (or the DB 4A). The clip viewer 204 perform a keyword search, based on a searching keyword input by the user, and searches for clips whose contents correspond to the searching keyword. For example, a clip with which the searching keyword is associated as a tag, or a clip having a word corresponding to the searching keyword as a keyword is searched for as clips whose contents correspond to the searching keyword. Therefore, the user can efficiently search for a clip they want to view, utilizing the tag.

The clip viewer 204 comprises a clip acquiring module 71 and a clip-list display processing module 72. The clip acquiring module 71 acquires a plurality of clips (a plurality of clip data items) stored in the DB 4A (or the DB 71A). Each of the clips, as described above, is created from a document such as a Web page or a part of the document. The clip-list display processing module 72 displays a view screen (clip list view screen) for enabling the acquired clips to be viewed, on the LCD 17A.

The clip viewer 204 has two types of searching functions to enable a desired clip to be easily found from a large number of clips stored in the DB 4A (or the DB 71A). One of the two types of searching functions is the keyword search to be made as described above.

The keyword search is processing for acquiring information regarding one or more clips corresponding to a searching keyword input by the user to a search key input area in the clip list view screen. That is, in the keyword search, one or more clips corresponding to the searching keyword input by the user are searched for. In the keyword search, as described above, a clip with which a tag including a word corresponding to the searching keyword is associated or a clip including keywords including the word corresponding to the searching keyword is presented to the user as a search result corresponding to the searching keyword.

The keyword search is made by a keyword search module 73 which is one of modules provided in the clip-list display processing module 72.

Alternatively, the keyword search may be made by the cloud server 4. In this case, the clip viewer 204 transmits to the cloud server 4 the searching keyword input by the user, and acquires information regarding one or more clips corresponding to the searching keyword, from the cloud server 4.

However, in the above keyword search, unless inputting a proper searching keyword, the user can not find a desired clip for the user. In particular, in the case where several hundreds of clips or more are stored in the DB 4A (or the DB 71A), if only the keyword search using one or more searching keywords input by the user is made, there is a case where a desired clip for the user is hard to find. As a result, there is a possibility that e.g., several tens of clips or more, may be presented to the user. If so, the user cannot easily check the contents of the clips one by one. Furthermore, there is also a case where if the input searching keyword is not proper, a hit, i.e., the above desired clip, is not found.

In view of the above, in addition to the function of making the keyword search, the clip viewer 204 has a function of making a similar clip search.

In the similar clip search, the searching keyword input by the user is not used, and a given already stored clip itself, which is selected in accordance with an operation by the user, is designated as a kind of search key. Also, in the similar clip search, information regarding one or more already stored clips related to the above designated clip (i.e., one or more clips similar to the designated clip) is acquired. That is, in the similar clip search, one or more already stored clips related to the designated clip are searched for.

To be more specific, the similar clip search automatically searches for one or more stored clips satisfying search conditions which are determined according to the content of the designated clip (keywords corresponding to the designated clip, tags associated with the designated clip, etc.). The user does not need to input a searching keyword, and can easily find, simply by performing an operation for selecting a certain one of already stored clips, another clip related to the selected clip. The similar clip search is made by a similar clip search module 74 which is one of the modules in the clip-list display processing module 72.

In accordance with an operation on the clip list view screen which is performed by the user, the similar clip search module 74 selects as search keys, a first clip group from a plurality of clips acquired from the DB 4A (or the DB 71A). In this case, the touch screen display 17 can function as an input device capable of designating the above first clip group as the search keys in accordance with the operation by the user. It should be noted that the first clip group mean one or more clips designated as search key in accordance with the operation by the user. In other words, the first clip group may comprise only one clip or two or more clips. Furthermore, the similar clip search module 74 searches for one or more second clips of the above plurality of clips, which are related to the first clip group. The search for one or more second clips which are related to the first clip group is made using a plurality of keywords extracted from one or more documents corresponding to the first clip group and a plurality of keywords extracted from documents corresponding to other clips of the plurality of clips. Above other clips are clips other than the first clip group.

To be more specific, the similar clip search module 74 calculates the degree of relevance between the first clip group and each of the other clips (i.e., each of the clips excluding the first clip group), using the relevance calculation engine 203. The similar clip search module 74 searches for one or more second clips, which are related to the first clip group, based on the degree of relevance between the first clip group and each of the other clips.

In the above relevance calculating processing, the degree of relevance between clips is calculated based on, e.g., the co-occurrence degree of keywords as described above.

The processing for calculating the degree of relevance between the first clip group and each of the other clips, as described above, uses a plurality of keywords extracted from one or more documents corresponding the first clip group (i.e., a plurality of keywords included in one or more clip data items corresponding to the first clip group) and a plurality of keywords extracted from document corresponding to each of the other clips (i.e., a plurality of keywords included in clip data corresponding to each of the other clips). In this case, in accordance with matching between the plurality of keywords extracted from the one or more documents corresponding to the first clip group and the plurality of keywords extracted from the document corresponding to each of the other clips, score indicating relevance between the first clip group and each of the other clips is calculated.

Therefore, the similar clip search enables a clip including content related to contents of the group of first clips to be easily searched for.

As described above, the processing for calculating the degree of relevance between clips may use all tags associated with the clips, in addition to keywords extracted from documents corresponding to the clips. This is because the tags associated with the clips also include words.

Furthermore, in the processing for calculating the degree of relevance between clips, the reference based on which the degrees are calculated is not limited to the co-occurrence degree of keywords; that is, the degrees can be calculated based on various formal and meaningful features such as dates and times when the clips were created, dates and times when Web pages, from which the clips were extracted, were accessed, document types of the Web pages, fields to which the contents of the clips belong, etc.

It should be noted that the above similar clip search can also be made by the cloud server 4. In this case, the clip viewer 204 transmits a search key (information regarding one or more first clips designated in accordance with the operation by the user), thereby acquiring from the cloud server 4 information regarding one or more already clips which are related to the one or more first clips.

Also, the clip viewer 204 can execute search processing (hybrid search) which is a combination of the keyword search and the similar clip search. In this case, the clip viewer 204 can acquire information regarding one or more clips which have contents corresponding to the searching keyword input by the user and are related to the first clip group. In this case, the clip viewer 204 first executes processing for acquiring information regarding one or more third clips which have contents corresponding to a searching keyword input by the user, that is, a keyword search to search for one or more third clips which have contents corresponding to the searching keyword. Then, using a plurality of keywords extracted from one or more documents corresponding to the first clip group designated in accordance with the operation by the user and a plurality of keywords extracted from one or more documents corresponding to one or more clips searched for by the keyword search, the clip viewer 204 executes processing for acquiring information regarding one or more second clips related to the first clip group, i.e., it executes processing for searching for one or more clips of one or more third clips, which are similar to the first clip group.

To be more specific, the clip viewer 204 calculates the degree of relevance between the first clip group designated in accordance with the operation by the user and each of the one or more clips searched for by the keyword search. Then, based on the calculated degree of relevance, the clip viewer 204 searches for one or more second clips, i.e., one or more clips which are included in one or more clips searched for by the keyword search and related to the first clip group.

It should be noted that the hybrid search can also be made by the cloud server 4.

Figure 6:
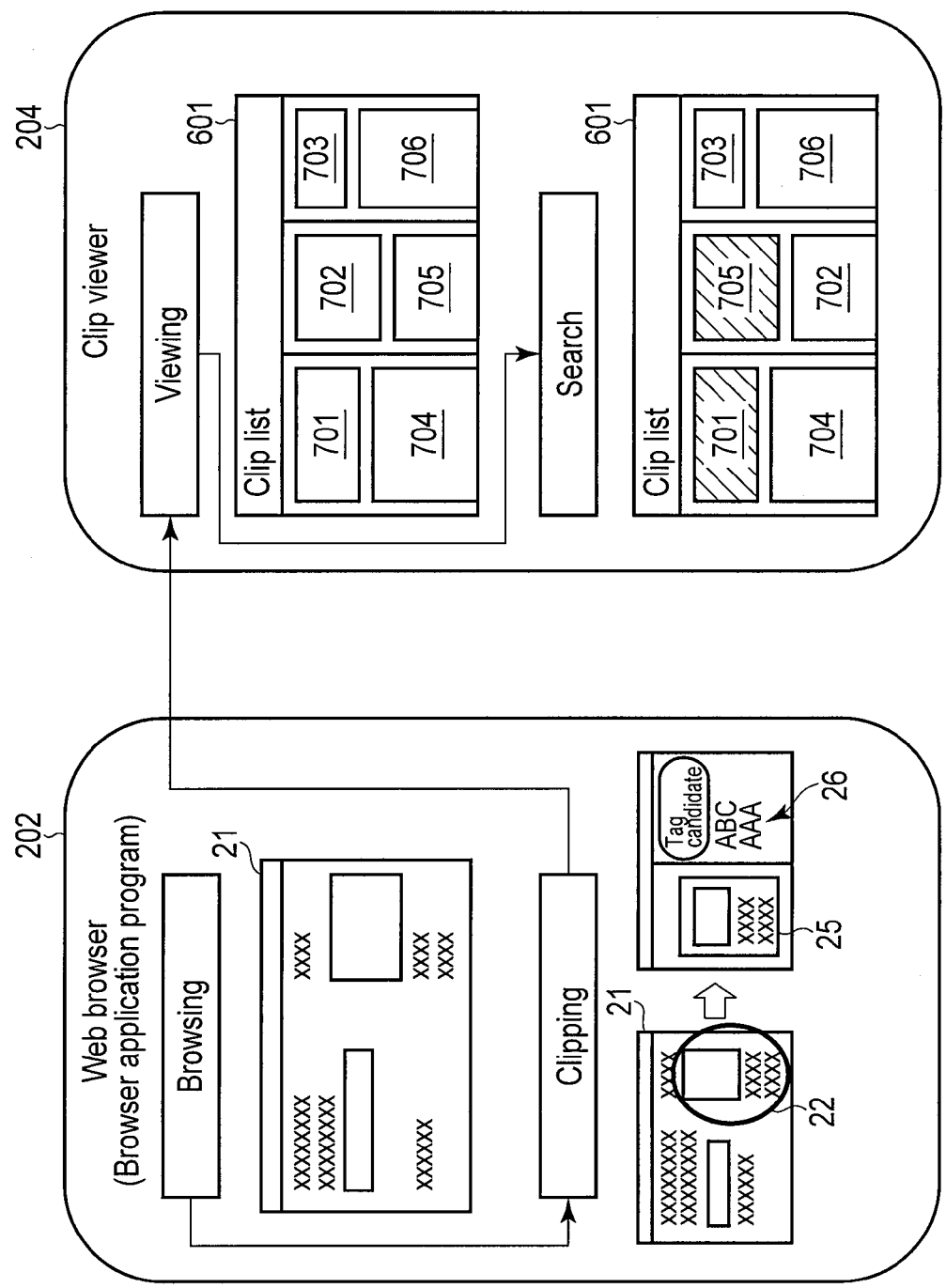
FIG. 6 is an exemplary view for explaining a series of processes including a clip process and a clip search process which are to be executed by the electronic device according to the embodiment.

FIG. 6 is a view for use in explaining a series of processes to be carried out by the tablet computer 10.

The browser application program 202 executes browsing processing and clipping processing. In the browsing processing, the browser application program 202 displays a Web page 21. The clipping processing is processing for storing a clip (Web clip) corresponding to at least a part of area of the Web page 21 in the storage medium. When the user performs a clipping operation for designating a clip area 22 of the Web page 21, the browser application program 202 presents the extracted clip 25 and a plurality of tag candidates (hereinafter also referred to as recommended tags) 26 to the user. The browser application program 202 stores the clip 25 and the tag candidates selected by the user in the storage medium, e.g., the DB 4A or the DB 71A.

The clip viewer 204 executes viewing processing for viewing a list of stored clips and search processing for searching for a desired clip. In the viewing processing, the clip viewer 204 displays a clip list view screen 601. The clip list view screen 601 is a view screen for enabling a plurality of clips already stored in the DB 4A (or the DB 71A) to be viewed. FIG. 6 illustrates by way of example that clips 701-706 are displayed on the clip list view screen 601.

In the search processing, at least one of the above keyword search and the similar clip search is made. That is, the keyword search module 73 and the similar clip search module 74 function as a processor configured to make at least one of the keyword search and the similar clip search.

Suppose the user selects the clip 701 as a clip to be noted for the similar clip search. In this case, the clip viewer 204 designates the clip 701 selected as the clip to be noted, as a search key (query clip), and makes the similar clip search to find a clip related to the clip 701.

FIG. 6 illustrates the case where the clip 705 is searched for as a clip related to the clip 701. The clip viewer 204 may highlight the clip 705 on the clip list view screen 601, it may scroll the clip list view screen 601 such that the clip 705 appears in the clip list view screen 601 if the clip 705 is located outside the clip list view screen 601, or it may interchange the clip 705 and another clip (the clip 701 in the case shown in FIG. 6) with each other such that the clip 705 is displayed in uppermost part of the clip list view screen 601.

In the embodiment, as described with respect to FIG. 5, not URL corresponding to each clip, document (HTML files) corresponding to each clip is stored in the DB 4A (or the DB 71A). Therefore, in either the viewing processing or the search processing, if it is detected a gesture (e.g., a tap gesture) on an arbitrary clip on the clip list view screen 601, a Web page from which the clip is extracted can be displayed based on the HTML file corresponding to the clip.

Figure 7:
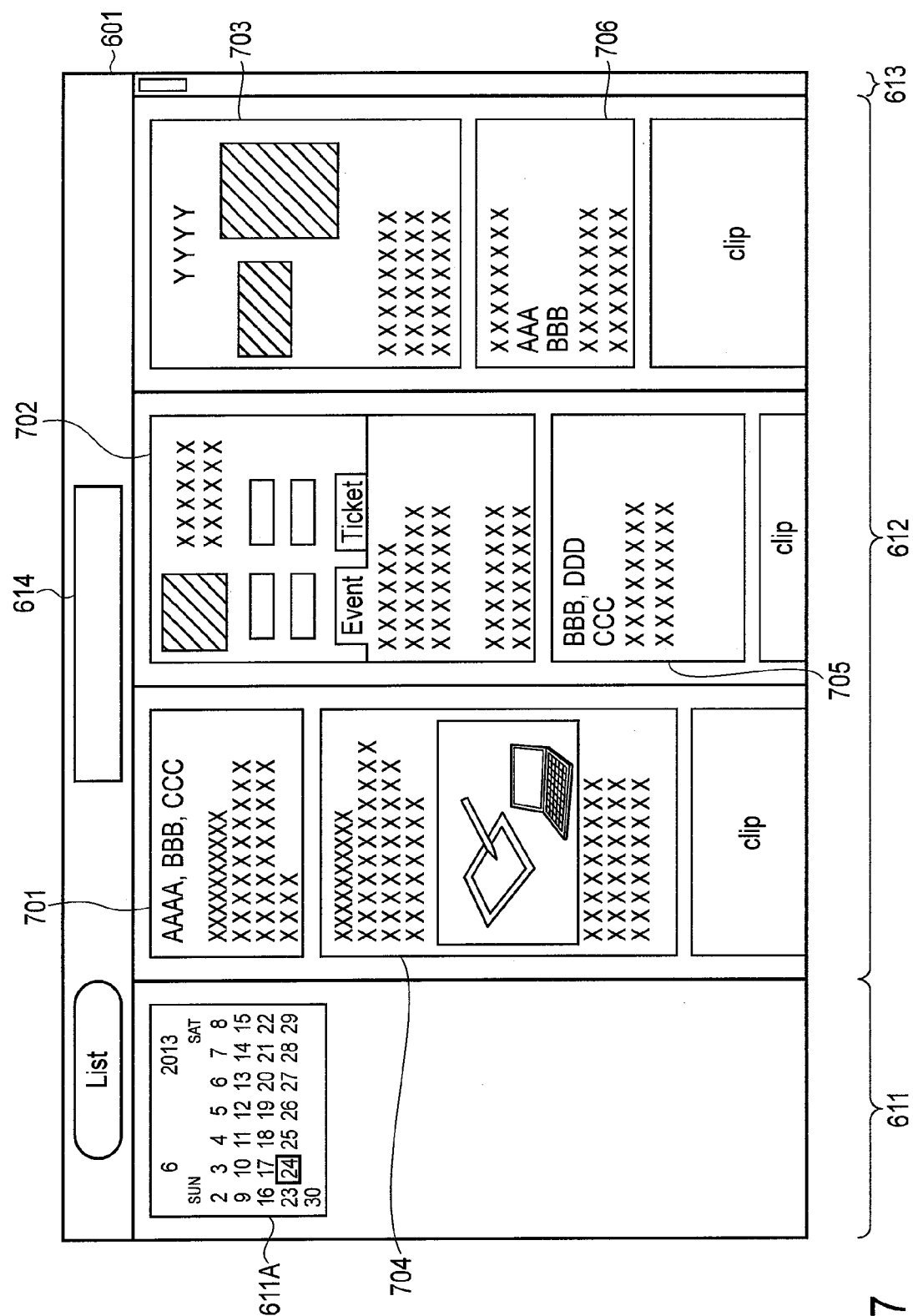
FIG. 7 is an exemplary view illustrating a clip list view screen which is presented to a user by the electronic device according to the embodiment.

FIG. 7 illustrates an example of the clip list view screen 601.

The clip list view screen 601 includes a calendar display area 611, a clip-list display area 612, a vertical scroll bar 613, a searching keyword input box 614, etc. The calendar display area 611 displays a calendar gadget 611A. The calendar gadget 611A can highlight a present data and time.

The clip-list display area 612 is a display area for displaying a list of stored clips. For example, in the clip-list display area 612, a plurality of clips (herein clips 701-706) are displayed. For example, a plurality of thumbnail images corresponding to the plurality of clips (clips 701-706) may be displayed in the clip-list display area 612.

The clips 701-706 (thumbnail images corresponding to the clips 701-706) may be displayed in chronological order in the clip-list display area 612 such that the later the date and time at which the clip was created (it was stored), the higher the position of the clip in the clip-list display area 612. In the clip-list display area 612, the clips may be displayed such that they have the same width.

The clip viewer 204 can change clips to be displayed in the clip-list display area 612 by scrolling the clip-list display area 612 in a vertical direction in accordance with detection of an operation by the user (e.g., finger swiping gesture at a location on the clip-list display area 612). Thereby, even if the case where clips the number of which is larger than that of clips simultaneously displayable in the clip-list display area 612 are stored in the DB 4A, the user can easily find an arbitrary clip by making a gesture for scrolling the clip list view screen 601 (the clip-list display area 612).

The searching keyword input box 614 is an input area to which a searching keyword is to be input. The user can input an arbitrary searching keyword to the searching keyword input box 614 by operating a software keyboard. The clip viewer 204 can search for a clip having content corresponding to an input searching keyword.

Next, the similar clip search will be explained with reference to FIG. 8.

Figure 8:
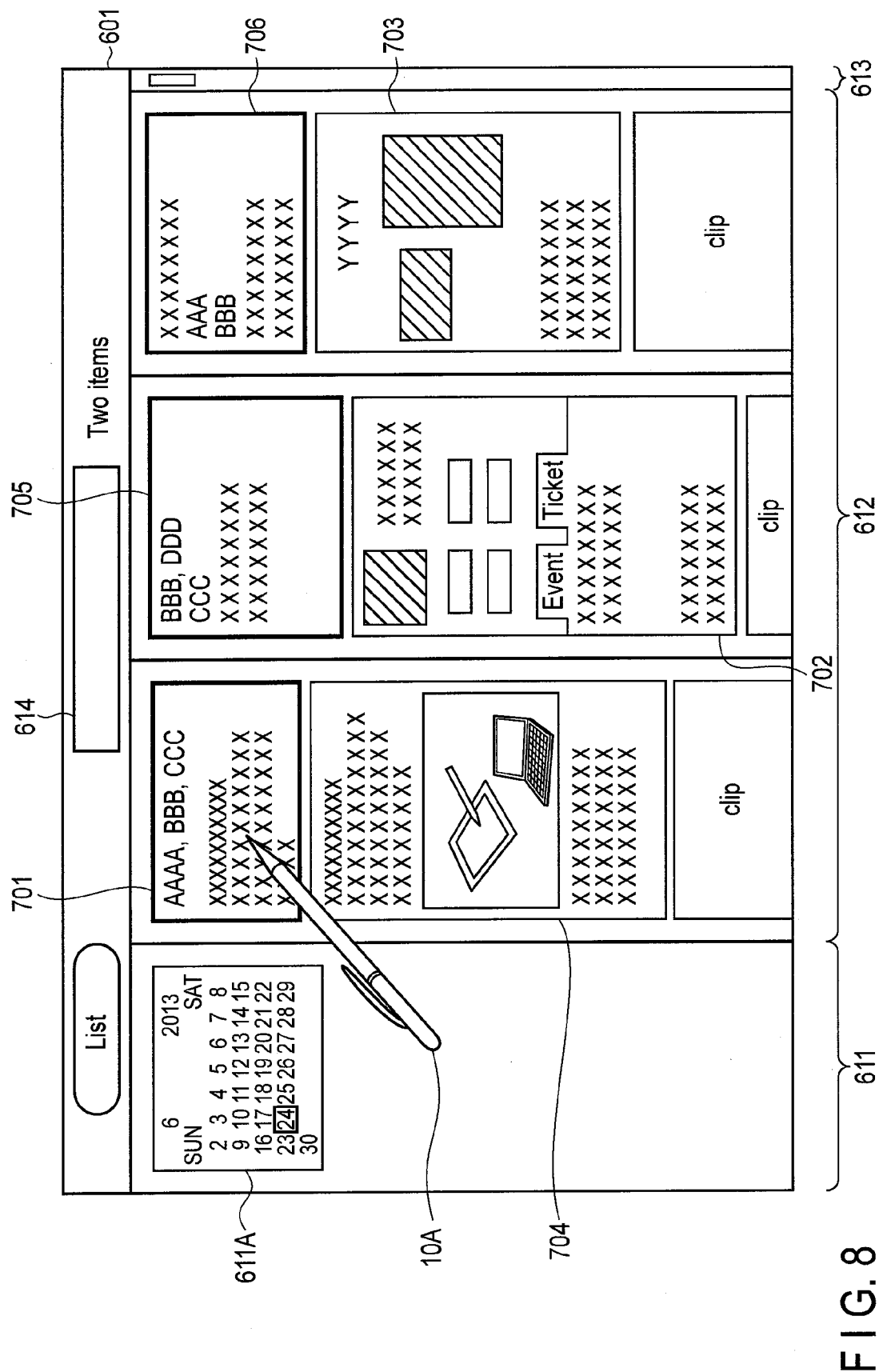
FIG. 8 is an exemplary view for explaining a similar clip search process which is executed on the clip list view screen.

FIG. 8 illustrates the case where the user selects the clip 701 as a clip to be noted. The clip viewer 204 makes the similar clip search, if it is detected that for example, the clip 701 is dragged toward the searching keyword input box 614. In this case, first, the clip viewer 204 designates the clip 701 selected by the user as a query clip (search key). Then, the clip viewer 204 searches for one or more clips stored in the DB 4A, which are related to the clip 701 designated as the query clip.

Suppose the degree of similarity between the clip 701 designated as the query clip and the clip 705 is high and that between the clip 701 and the clip 706 is also high. In this case, the clip viewer 204 searches for the clips 705 and 706 as clips related to the query clip (search key), and displays the clip 705 and 706 as the search result corresponding to the query clip (search key). In this case, the clip viewer 204 may change the state of images to be displayed on the clip-list display area 612 such that the clips 705 and 706 are displayed in the uppermost part of the clip-list display area 612 as shown in FIG. 8. To be more specific, the state of the images to be displayed may be changed as follows:

In the case shown in FIG. 7, the clips 702 and 703 are displayed in the uppermost part of the clip-list display area 612. However, after the similar clip search is made, the clip 705 is interchanged with the clip 702, and as a result the clip 705 is displayed in the upper part of the clip-list display area 612 as shown in FIG. 8. Similarly, the clip 706 is interchanged with the clip 703, and as a result the clip 706 is displayed in the upper most part of the clip-list display area 612 as shown in FIG. 8.

Figure 9:
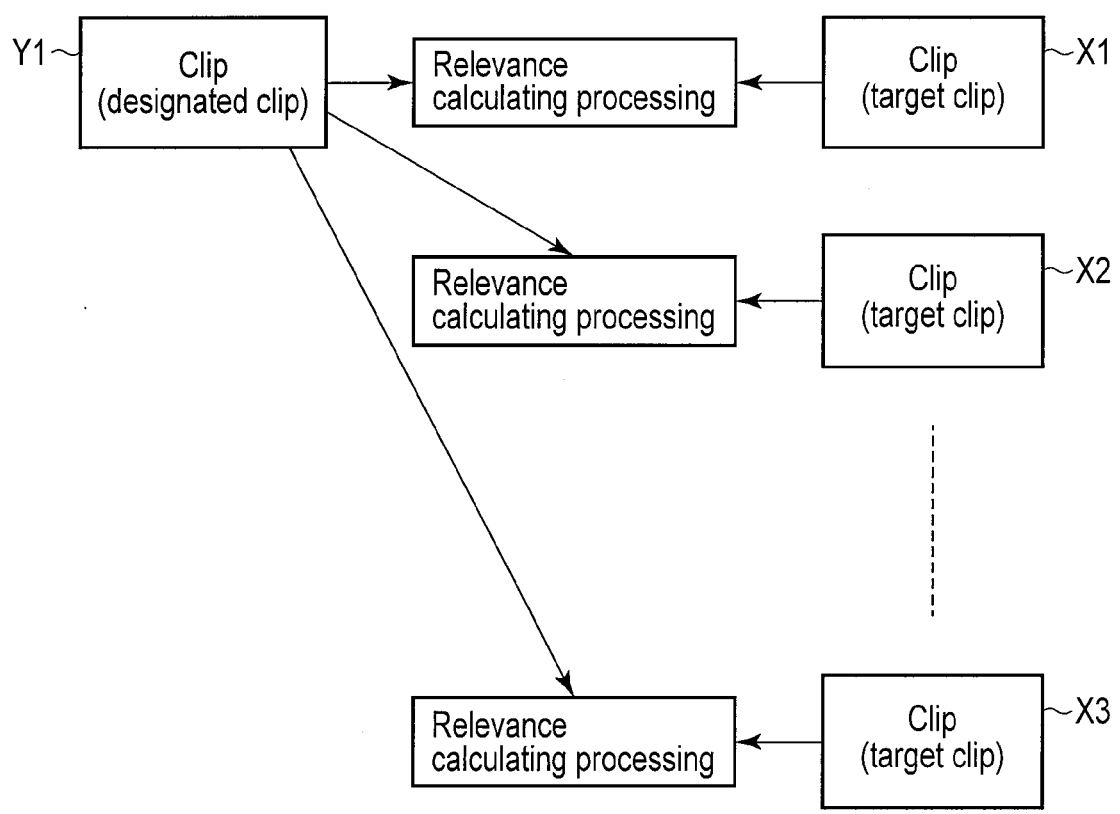
FIG. 9 is an exemplary view for explaining a relevance calculating process which is executed in the similar clip search process of FIG. 8.

FIG. 9 is a view for explaining the relevance calculating process which is executed in the similar clip search.

Suppose a clip Y1 is "designated clip" (query clip), and clips X1, X2 and X3 are "target clips" for which a calculation is made to determine their relevance with the designated clip.

First, the clip viewer 204 calculates the relevance score R1 between the clip Y1 and the clip X1, using the relevance calculation engine 203. In this case, the relevance calculation engine 203 calculates the relevance score R1 between the clip Y1 and the clip X1, using words corresponding to the clip Y1 and words corresponding to the clip X1. The words corresponding to the clip Y1 may include all keywords extracted from a document corresponding to the clip Y1. Also, the words corresponding to the clip X1 may include all keywords extracted from a document associated with the clip X1.

Alternatively, the words corresponding to the clip Y1 may include all tags associated with the clip Y1, in addition to all the keywords extracted from the document corresponding to the clip Y1. Also, the words corresponding to the clip X1 may include all tags associated with the clip X1, in addition to all the keywords extracted from the document corresponding to the clip X1.

If the relevance score R1 between the clip Y1 and the clip X1 is equal to or higher than a predetermined threshold, the clip viewer 204 determines the clip X1 to be a clip related to the query clip, and add the clip X1 to the search result.

Then, the clip viewer 204 calculates the relevance score R2 between the clip Y1 and the clip X2, using the relevance calculation engine 203. In this case, the relevance calculation engine 203 calculates the relevance score R2 between the clip Y1 and the clip X2, using words corresponding to the clip Y1 and words corresponding to the clip X2. The words corresponding to the clip Y1 may include all keywords extracted from a document corresponding to the clip Y1. Also, the words corresponding to the clip X2 may include all keywords extracted from a document corresponding to the clip X2.

Alternatively, the words corresponding to the clip Y1 may include all tags associated with the clip Y1, in addition to all the keywords extracted from the document corresponding to the clip Y1. Also, the words corresponding to the clip X2 may include all tags associated with the clip X2, in addition to all the keywords extracted from the document corresponding to the clip X2.

If the relevance score R2 between the clip Y1 and the clip X2 is equal to or higher than the above threshold, the clip viewer 204 determines the clip X2 to be a clip related to the query clip, and adds the clip X2 to the search result.

Similarly, the clip viewer 204 calculates the relevance score R3 between the clip Y1 and the clip X3, using the relevance calculation engine 203. If the relevance score R3 is equal to or higher than the above threshold, the clip viewer 204 determines the clip X3 to be a clip related to the query clip, and adds the clip X3 to the search result.

Next, suppose the clip Y1 and the clip Y2 (not shown) are "designated clips" (query clips). In this case, for example, with respect to the clip X1, the clip viewer 204 may calculate the relevance score R1 between the clip Y1 and the clip X1, and the relevance score R11 between the clip Y2 and the clip X1. In this case, if the relevance score R1 and the relevance R11 are both equal to or higher than the above threshold, the clip X1 may be added to the search result, and also if an average value of the degrees R1 and R11 is equal to or higher than the threshold, the clip X1 may be added to the search result. Also, for the clips X2 and X3, the same processing as for the clip X1 can be executed.

Alternatively, the clip viewer 204 may input all keywords including the plurality of keywords extracted from the document corresponding to the clip Y1 and a plurality of keywords extracted from a document corresponding to the clip Y2, as a group of keywords corresponding to "specified clip", to the relevance calculation engine 203.

Figure 10:
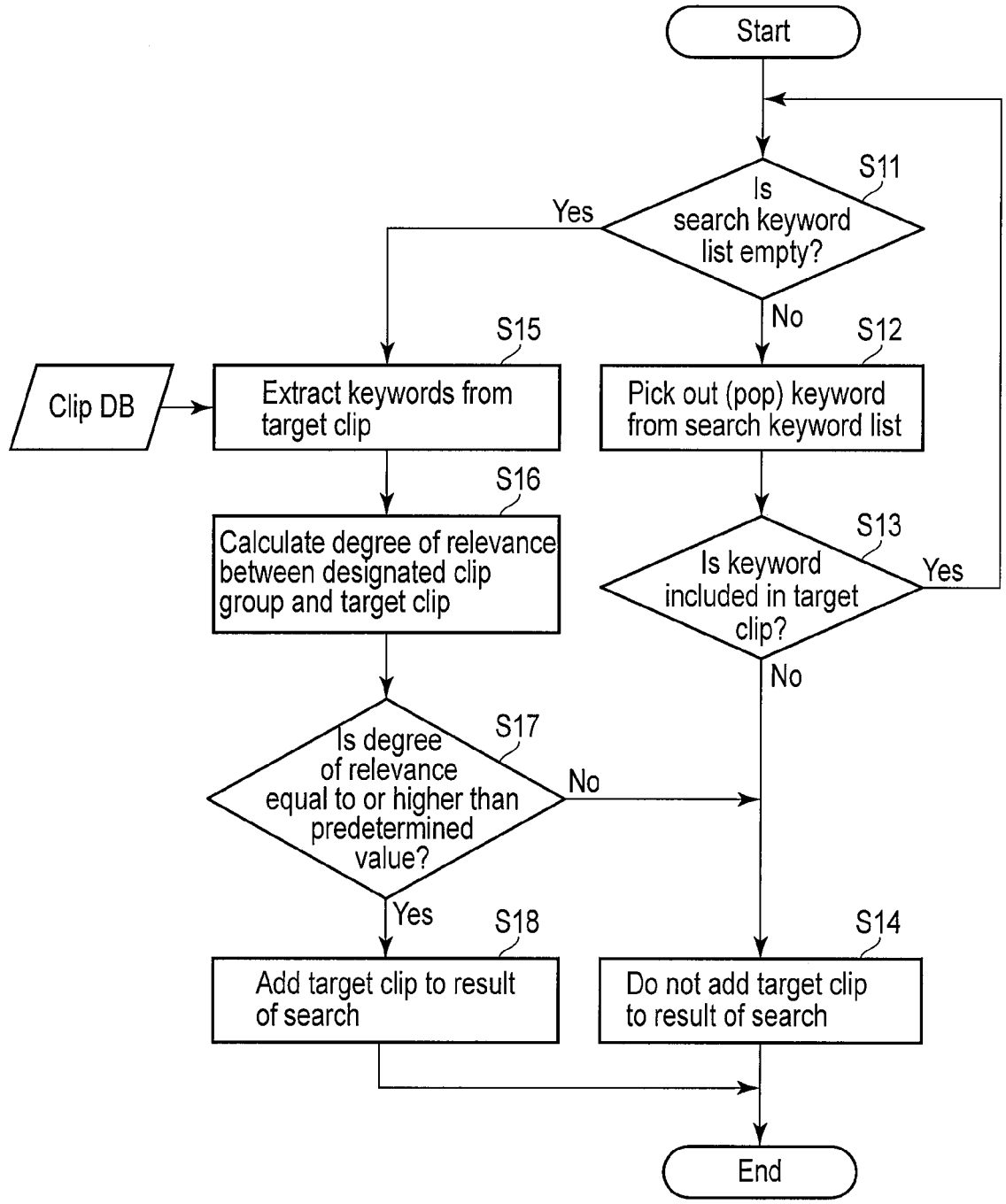
FIG. 10 is an exemplary flowchart illustrating a procedure of the similar clip search process which is executed by the electronic device according to the embodiment.

The flowchart of FIG. 10 shows a procedure of the similar clip search.

The following explanation is given with respect to the case where the above hybrid search, which is a combination of the keyword search and the similar clip search, is made.

The hybrid search may be made, for example, in the case where one or more clips (designated clip group) are dragged toward the searching keyword input box 614, in the state in with one or more searching keywords are input to the searching keyword input box 614. The clips other than the designated clips will hereinafter be referred to as target clips. Also, the following explanation is given with respect to the case where two keywords KW1 and KW2 are input to the searching keyword input box 614.

In the hybrid search, the clip viewer 204 first determines whether a searching keyword list is empty or not (step S11). The searching keyword list is a list of searching keywords input to the searching keyword input box 614 by the user.

If the searching keyword list is not empty (No in step S11), the clip viewer 204 makes the keyword search to acquire information regarding one or more target clips having contents related to the searching keywords KW1 and KW2. To be more specific, the following processing is executed.

The clip viewer 204 picks out (pops) the keyword KW1 from the searching keyword list (step S12). Then, the clip viewer 204 determines whether a keyword which is the same as the keyword KW1 is included in a group of keywords corresponding to a present target clip (step S13).

If the keyword which is the same as the keyword KW1 is not included in the group of keywords corresponding to the present target clip (No in step S13), the present target clip is not added to the result of the search (step S14).

On the other hand, if the keyword which is the same as the keyword KW1 is included in the group of keywords corresponding to the present target clip (Yes in step S13), the process to be carried out is returned to the step S11.

If the searching keyword list is still not empty (No in step S11), the clip viewer 204 picks out the keyword KW2 as a new keyword from the keyword list (step S12). Then, the clip viewer 204 determines whether a keyword which is the same as the keyword KW2 is included in the group of clips corresponding to the present target clip (step S13).

If the keyword which is the same as the keyword KW2 is not included in the group of clips corresponding to the present target clip (No in step S13), the present target clip is not added to the result of the search (step S14).

On the other hand, if the keyword which is the same as the keyword KW2 is included in the group of clips corresponding to the present target clip (Yes in step S13), the process to be carried out is returned to the step S11.

While changing the present target clip, the above processing is repeatedly executed. Thereby, information regarding one or more target clips having contents corresponding to the searching keywords KW1 and KW2 is obtained. In other words, the clips for which the similar clip search should be made are narrowed to one or more target clips having contents corresponding to the searching keywords KW1 and KW2.

If the searching keyword list becomes empty (Yes in step S11), the clip viewer 204 makes the following similar clip search:

The clip viewer 204 extracts keywords from clip data corresponding to the present target clip having content corresponding to the searching keywords KW1 and KW2 (step S15). A plurality of keywords extracted from a document corresponding to the present target clip are already stored in the clip database (the DB 4A or the DB 71A). Therefore, in the step S15, the clip viewer 204 may acquire a plurality of keywords corresponding to the present target clips, from the clip database.

Then, the clip viewer 204 calculates the degree of relevance between the designated clip group and the target clip, using the relevance calculation engine 203 (step S16). Then, the clip viewer 204 determines whether the calculated degree of relevance (relevance score) is equal to or higher than a predetermined value (threshold) or not (step S17).

If the calculated degree of relevance is not equal to or higher than the predetermined value (No in step S17), the present target clip is not added to the result of the search (step S14).

On the other hand, if the calculated degree of relevance is equal to or higher than the predetermined value (Yes in step S17), the present target clip is added to the result of the search (step S18).

The steps S15 to S19 are carried out with respect to all the target clips having contents corresponding to with the searching keywords KW1 and KW2. In such a manner, information regarding the clips related to the designated clip group is acquired. To be more specific, clips which have contents corresponding to the searching keywords KW1 and KW2 and have higher relevance degree with the designated clip group are determined as the search result. The determined clips are displayed in the clip list view screen 601.

As explained above, in the embodiment, in accordance with the operation on clip list view screen 601 which is performed by the user, a first clip group in the already stored clips is designated as search keys. Then, information regarding one or more second clips of the already stored clips, which are related to the first clip group, is acquired. Therefore, based on the clip designated by the operation performed with respect to the clip list view screen 601 by the user, another clip whose contents are related to the above designated clip can be easily found without the need to input an appropriate keyword.

Therefore, even if a large number of clips are present, a desired clip to be re-used can be easily found by making the similar clip search according to the embodiment.

The embodiment has been explained mainly with respect to the case of handling a clip corresponding to a Web page or part thereof. However, a clip corresponding to an arbitrary kind of document or part thereof can also be handled in the same manner as the clip corresponding to the Web page or part thereof.

Each of the processes according to the embodiment can be carried out by a computer program. Thus, the advantage of the embodiment can be easily obtained simply by installing the above computer program on an ordinary computer via a computer-readable storage medium storing the computer program.

The various modules of the systems described herein can be implemented as software applications, hardware and/or software modules, or components on one or more computers, such as servers. While the various modules are illustrated separately, they may share some or all of the same underlying logic or code.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An electronic device comprising:
a display; and
a processor configured to:
create a plurality of clips by extracting at least a part of each of documents displayed on a screen of the display, wherein the at least the part of each of the documents is selected by a user;
store the plurality of clips in a storage;
display on the screen the plurality of clips stored in the storage;
designate a first clip of the displayed plurality of clips, which is selected by the user, as a query clip, wherein the query clip is used for searching for a clip related to the query clip from the displayed plurality of clips;
search for one or more second clips related to the first clip from the displayed plurality of clips, using a first plurality of keywords extracted from a document corresponding to the first clip and a second plurality of keywords extracted from documents corresponding to other clips of the displayed plurality of clips; and
display the one or more second clips as a search result for the first clip designated as the query clip, wherein the processor is further configured to designate each of one or more first clips of the displayed plurality of clips, which are selected by the user, as query clips, and to search for the one or more second clips related to the one or more first clips from the displayed plurality of clips.

2. The electronic device of claim 1, wherein
the processor is further configured to search for, if a searching keyword is input by the user, one or more third clips of the displayed plurality of clips, which have contents corresponding to the searching keyword, and to search for the one or more second clips related to the first clip from the one or more third clips.

3. The electronic device of claim 1, wherein the plurality of clips comprise at least a Web clip, and wherein the Web clip corresponds to at least a part of a Web page displayed on the screen by a Web browser.

4. A method comprising:
creating a plurality of clips by extracting at least a part of each of documents displayed on a screen of a display, wherein the at least the part of each of the documents is selected by a user;
storing the plurality of clips in a storage;
displaying on the screen the plurality of clips stored in the storage;
designating a first clip of the displayed plurality of clips, which is selected by the user, as a query clip, wherein the query clip is used for searching for a clip related to the query clip from the displayed plurality of clips;
searching for one or more second clips related to the first clip from the displayed plurality of clips, using a first plurality of keywords extracted from a document corresponding to the first clip and a second plurality of keywords extracted from documents corresponding to other clips of the displayed plurality of clips; and
displaying the one or more second clips as a search result for the first clip designated as the query clip, wherein the designating includes designating each of one or more first clips of the displayed plurality of clips, which are selected by the user, as query clips, and
the searching includes searching for the one or more second clips related to the one or more first clips from the displayed plurality of clips.

5. The method of claim 4, wherein if a searching keyword is input by the user, the searching includes:
   creating a plurality of clips by extracting at least a part of each of documents displayed on a screen of a display, wherein the at least the part of each of the documents is selected by a user;
   searching for one or more third clips of the displayed plurality of clips, which have contents corresponding to the searching keyword; and
   searching for the one or more second clips related to the first clip from the one or more third clips.

6. The method of claim 4, wherein the plurality of clips comprise at least a Web clip, and wherein the Web clip corresponds to at least a part of a Web page displayed on the screen by a Web browser.

7. The method of claim 4, wherein the displaying the plurality of clips on the screen comprises scrolling the plurality of the clips on the screen in accordance with an operation the user.

8. A computer-readable, non-transitory storage medium having stored thereon a computer program which is executable by a computer, the computer program controlling the computer to execute functions of:
   storing the plurality of clips in a storage;
   displaying on the screen the plurality of clips stored in the storage;
   designating a first clip of the displayed plurality of clips, which is selected by the user, as a query clip, wherein the query clip is used for searching for a clip related to the query clip from the displayed plurality of clips;
   searching for one or more second clips related to the first clip from the displayed plurality of clips, using a first plurality of keywords extracted from a document corresponding to the first clip and a second plurality of keywords extracted from documents corresponding to other clips of the displayed plurality of clips; and
   displaying the one or more second clips as a search result for the first clip designated as the query clip, wherein
   the designating includes designating each of one or more first clips of the displayed plurality of clips, which are selected by the user, as query clips, and
   the searching includes searching for the one or more second clips related to the one or more first clips from the displayed plurality of clips.

9. The storage medium of claim 8, wherein if a searching keyword is input by the user, the searching includes:
   searching for one or more third clips of the displayed plurality of clips, which have contents corresponding to the searching keyword; and
   searching for the one or more second clips related to the first clip from the one or more third clips.

10. The storage medium of claim 8, wherein the plurality of clips comprise at least a Web clip, and wherein the Web clip corresponds to at least a part of a Web page displayed on the screen by a Web browser.

* * * * *